United States Patent [19]

Owen et al.

[11] 3,974,089

[45] *Aug. 10, 1976

[54] PROCESS FOR PREVENTING SEGREGATION OF A COMPONENT IN A MIXTURE OF POWDERS

[75] Inventors: James E. Owen, Mount Holly, N.C.; J. William Vogt, South Russell, Ohio

[73] Assignee: The Harshaw Chemical Company, Cleveland, Ohio

[ * ] Notice: The portion of the term of this patent subsequent to Sept. 24, 1991, has been disclaimed.

[22] Filed: Sept. 20, 1974

[21] Appl. No.: 507,917

Related U.S. Application Data

[63] Continuation-in-part of Ser. No. 287,578, Sept. 19, 1972, Pat. No. 3,838,064, which is a continuation-in-part of Ser. No. 136,267, April 21, 1971, abandoned.

[52] U.S. Cl. ............................................. 252/384
[51] Int. Cl.$^2$............................................ C09K 3/22
[58] Field of Search................... 252/384; 260/92.1; 117/100 C, 100 A, 100 D, 100 M, 100 S, 100 B

[56] References Cited
UNITED STATES PATENTS 2,961,712  10/1960  Davis ...................................... 18/55
3,389,105  6/1968  Bogler.................................... 260/23
3,838,064  9/1974  Vogt ..................................... 252/384

*Primary Examiner*—Samuel Feinberg
*Assistant Examiner*—Ralph Palo
*Attorney, Agent, or Firm*—Alfred D. Lobo

[57] ABSTRACT

A method is disclosed for preventing segregation of particles within a finely divided powder having disparate particle size ranges, compositions or densities. The method includes working the powder with a minute amount, preferably less than about 1% by weight of the powder, of a finely divided fibrillatable polytetrafluoroethylene resin (hereinafter referred to as PTFE) to form a mixture with the powder. The PTFE resin may be added to the powder as a colloidal aqueous dispersion or as a fine powder obtained by coagulation of the colloidal dispersion. Whichever form is used, the PTFE is intimately mixed with the finely divided powder to form a dry mixture. Alternatively, the PTFE resin may be blended with the powder in a wet treatment to facilitate the homogenous dispersion of the resin. In any event, the mixture of resin and powder is worked either in the wet state, preferably as a paste, or as a dry blend, using a masticating or kneading action to fibrillate the PTFE. Sufficient working is carried out to produce a random network of PTFE fibers sufficient to loosely entrap the powdery material and to prevent segregation thereof.

8 Claims, No Drawings

PROCESS FOR PREVENTING SEGREGATION OF A COMPONENT IN A MIXTURE OF POWDERS

CROSS-REFERENCE TO RELATED APPLICATIONS

This is a continuation-in-part application of application Ser. No. 287,578 filed Sept. 19, 1972 and issued as U.S. Pat. No. 3,838,064, which in turn is a continuation-in-part of application Ser. No. 136,267 filed Apr. 21, 1971, now abandoned.

BACKGROUND OF THE INVENTION

The segregation of a powder in a mixture of powders, whether of the same or different composition, has been a problem since earliest times. More recently, numerous mixtures of powders are shipped in bulk, particularly mixtures of pigments and certain finely divided filler materials. It has been found that where such finely divided powder mixtures are stored for a relatively long period of time, or where they are subjected to the expected vibrations of a journey from the point of shipment to the point of use, a pronounced segregation effect is noted. The manner in which a component of a mixture of powders may segregate is generally unpredictable, and the extent to which such segregation may occur is therefore difficult to estimate. Where segregation does occur, it is recognized that mixtures of finely divided powders often require remixing at the point of arrival prior to being used. Remixing is an economic handicap, and this unit operation is generally a source of irritation and danger due to the generally high proclivity of powder mixtures to dust. Our parent application taught a process for rendering normally high dusting powders dustless, and a process to prevent segregation of particles due to size or density differences. This process for prevention of segregation of solid particles was deemed particularly important when different powdered materials are to be homogeneously blended and thereafter maintained in a well-blended condition. The instant patent application more fully teaches a method of maintaining a mixture of finely divided particles having size and/or density differences in a homogeneous segregation-resistant state. By finely divided particles, we refer to particles generally smaller than about 100 mesh (U.S. Standard) though larger particles may also be prevented from segregation. The upper limit of the particle size affected by the process of this invention will depend on the particular physical properties of the particles.

A large number of prior art processes are directed to the prevention of segregation of finely divided materials. However, we are unaware of any reference teaching a process for prevention segregation of a powder mixture, whether dusty or not, without changing the essential physical characteristics of the mixture. The instant invention is directed to the prevention of segregation in a bulk, finely divided and superfinely divided mixture of particulate powders which, having been treated in accordance with the instant process, may be subjected to the vibrations inherent to the mode of transportation of the mixture, or stored practically indefinitely without segregating and without exhibiting dusting when used.

The process of this invention prevents segregation of finely divided materials whether they are dusty or not. It will be apparent that, though dustiness of a powder is not a prerequisite, the process will generally be of most benefit where the finely divided materials are normally high-dusting.

Materials which exhibit high dusting are exemplified by finely ground silica of less than 325 U.S. Standard mesh, finely ground pigments, flour, and various other inorganic and organic materials which have a sufficiently high content of fine and superfine particles to generate an undesirable dusting problem. A high tendency to dust is most evident in powder having particles in the micron and submicron range, as for example, in talc, clay, particulate electrodeposited metals and metal oxides formed in certain processes, and especially in carbon black and various forms of activated carbon.

Finely divided materials which are not normally high dusting include silicon carbide, coke, sand, heavy metal particles, and the like, which have a high tendency to segregate whether mixed with non-dusty powders or dusty powders.

SUMMARY OF THE INVENTION

It has been discovered that a simple process which includes working of fibrillatable PTFE with one or more powders, whether of the same or different compositions, blended into a mixture, effectively eliminates the tendency of any component of the mixture of powders to segregate.

It is therefore, a general object of this invention to provide a process for preventing segregation of any component of a mixture of normally high-dusting components.

It is a specific object of this invention to stabilize a mixture of dusty powders of particles having disparate size ranges, by working the mixture with a minute amount, less than about 1 percent by weight based on total solids, of fibrillatable PTFE resin.

It is a more specific object of this invention to prevent segregation of certain particles with physical characteristics different from other particles in a mixture of powders, whether of the same or different compositions, in which all particles are more or less uniformly distributed.

It is another specific object of this invention to stabilize a mixture of finely divided powders by adding to the mixture of finely divided powders less than 1 percent by weight of PTFE and kneading the mixture with a gentle simultaneous shearing and mild compacting action until a random network of fibers of PTFE is formed sufficient to loosely ensnare the particles and prevent segregation therebetween.

These and other objects, features and advantages of this invention will become apparent to those skilled in the art from the following description of preferred embodiments thereof, and the examples set forth herein.

DETAILED DESCRIPTION OF THE INVENTION

In each embodiment of the instant invention, only a fibrillatable form of PTFE may be used. In particular, the most common form of PTFE is unfibrillatable, granular molding powder, which is ineffective in the process of this invention. Similarly, other carbonaceous polymers such as other polyhalocarbons and polyolefins, silicones and modifications thereof are ineffective in producing comparable non-segregating and non-dusting characteristics in a normally high-dusting and segregation-prone powder, without essentially changing its physical characteristics. A fibrillatable form of PTFE is presently restricted to two commercially available types of emulsion polymerized resin. A first type is a colloidal aqueous dispersion available in concentrations of about 33 percent and about 60 percent by weight of polymer, having particles about $0.05\mu$ (microns) to about $0.5\mu$ in size, with average diameters of about $0.2\mu$. A second type, often referred to as "fine powder", is obtained by coagulation of the dispersion. This second type consists of agglomerates with average diameters of $450\mu$ and made up of primary particles ranging in size from 0.05 to $0.5\mu$ in diameter. Specific surface areas of these fine powders are on the order of 10–12 $m^2/g$, with an average apparent powder density of 475 g/liter. These types of resin and their manufacture are more fully described in U.S. Pat. No. 2,559,752.

As we understand the influence of these forms of PTFE in the suppression of segregation between fine and superfine particles, the essential factor is fibrillation of the PTFE in situ to generate a random network of microscopic and submicroscopic fibers which are distributed throughout the entire mixture, holding the primary normally high-dusting particles loosely in an agglomerate so as to maintain the essential physical properties of the powder. Such microscopic and submicroscopic fibers are evident in a treated and worked segregation-prone powder under extreme magnification. In a typical example, these fibers are developed in a mixture of powders having a primary particle size less than about 325 mesh, particularly including subsieve particles such as inorganic pigments having particle sizes in the range from less than about 1 micron to less than about 44 microns, when the mixture is worked with from about 0.02 to about 1 percent by weight, based on total solids, of fibrillatable PTFE.

Depending upon the properties of the segregation-prone powdery materials which constitute the mixture, particularly their size range and particle shape, an amount of PTFE as low as 0.02 percent by weight, when worked with the mixture, is found to substantially negate segregation of the particles; even lower concentrations may noticeably negate segregation. Continued working of the treated mixture so as to impart an amount of energy substantially in excess of the amount required to negate segregation may regenerate the proclivity of the particles of the segregation-prone mixture to segregate. Should this tendency to segregate reoccur, an additional amount of PTFE may be incorporated into the mixture with additional working so as to again yield a non-segregating powder. For economic reasons, the lowest amount of PTFE which renders the powder non-segregating, will be the amount used.

In the "dry" process referred to immediately hereinabove, typically, "fine powder" PTFE is preferably homogeneously dispersed in the mixture of powders, which mixture is then subjected to a gentle shearing action with moderate compaction and moderate heating. A desirable masticating or kneading action is provided by a slow-speed electrical mixer equipped with an impeller that smears the mixture of powders on the walls of a small laboratory scale receptacle. On a larger production basis, a representative apparatus which provides a suitable working action is a Sigma blade blender such as is used for the kneading of dough in a bakery, or a double cone blender, or a muller of the Simpson type adjusted for clearance so as to provide shear and mild compaction with a minimal amount of grinding. The same type of equipment may be used where the mixture is moist or pasty, or where so small a quantity of a colloidal aqueous dispersion of PTFE is used that the mixture is essentially dry.

The working is preferably effected under moderate heating conditions, preferably above 20°C., since it has been found that formation of the fibers in fibrillatable PTFE occurs more readily above this temperature. More preferably, optimum fibrillation is obtained quickly at temperatures of about 100°C. Higher temperatures may be utilized, limited only by the decomposition temperature of the PTFE or of the segregation-prone material, whichever is lower; but for economic reasons, processing temperatures in the range of from about 20° to about 200°C. are found generally satisfactory. In the dry process, working of the mixture for a sufficient period of time, during which enough energy is transferred to the mass so as to provide a visual indication that segregation of the powders has been sufficiently eliminated, completes the desegregating treatment of the mixture. Sintering of the mixture is neither necessary nor desirable. The treated mixture is virtually indistinguishable from the non-treated material in the quiescent state and the primary particle size of the components of the mixture is unchanged. Characteristically, however, the treated mixture is essentially non-segregating despite being free-flowing.

As has been stated hereinbefore, the amount of fibrillatable PTFE used is not critical. The precise choice of the amount of PTFE required to effect a predetermined degree of suppression of segregation in a particular mixture is a function of working and is determined by the economics of the cost of materials, balanced against the energy costs of processing them. A desirable level of desegregation in a normally high-dusting segregation-prone mixture of powders may be achieved with a relatively small amount of PTFE and, correspondingly, a greater amount of working. Alternatively, a relatively large amount of PTFE may be used to effect the same degree of desegregation, but requiring relatively less working. Thus, it will be apparent that at lower concentrations of PTFE substantially lower than 0.02 percent by weight level, continued working of the material for a prolonged period of time to effect fibrillation, may effectively suppress segregation of a submicron or superfine powder. On the other hand, the addition of a relatively larger amount than 0.02 percent PTFE may, with sufficient working of the mixture, form a coherent, pliable, doughy mass, and the addition of such a large amount should be avoided, except as an intermediate step to facilitate the econmical dispersion of additional material which is to be treated, as will be described more fully hereinafter.

It is well-known that it is difficult to impart energy to a finely divided powder because the powder is a poor energy absorber. Since a mixture of powders with PTFE must be worked to stabilize them, that is negate their tendency to segregate, it may sometimes be preferable first to form a doughy mass, which is a good energy absorber, and add incremental amounts of the material to the doughy mass. The formation of the doughy mass as an intermediate may include substantially more than 1 percent by weight PTFE, the amount used being chosen so that the concentration of PTFE in the final stabilized mixture is less than 1 percent by weight. Sufficient working of the mixture is effected to yield a free-flowing, but stable mixture of particles.

As mentioned hereinbefore, it is preferred that fibrillatable PTFE be homogeneously dispersed in the mixture of segregation-prone powders. Obtaining such a homogeneous dispersion in the dry state may be inconvenient, if not difficult, due to mixing and dusting problems. A convenient method of obtaining such a dispersion, which may then be worked to yield a non-segregating mixture, is embodied in the "wet" process of this invention.

In the first step of the wet process, particularly where a mixture of normally high-dusting powders are segregation-prone, the mixture is slurried with a colloidal aqueous dispersion of PTFE, or with fine powder PTFE, in a liquid processing aid in which the high-dusting powders are essentially insoluble. The amount of PTFE used to effectively treat a mixture of powders will approximate the amount used in the dry method described hereinabove, though, because of the relative ease of obtaining a homogeneous dispersion in liquid form, the total amount of mechanical energy imparted to the mixture to negate segregation of its constituents may be somewhat less, all other processing conditions being the same.

The amount of liquid processing aid in this wet process is not critical, and serves merely quickly to effect dispersion of the PTFE in the mixture. It will be recognized that with very low amounts of liquid processing aid, less than that amount required to form a smooth paste, a homogeneous mixture will be less conveniently effected than with a sufficient quantity of liquid to form a smooth paste or a fluid, easily mixed slurry. Enough liquid is used to form a paste or slurry which when subjected to a mixing action, preferably in a low speed mixer such as a Hobart or Banbury mixer, effects a homogeneous dispersion of the PTFE in the mixture. DUring mixing, some incidental and initial fibrillation of the PTFE will generally be experienced, the extent of fibrillation depending upon the physical characteristics of the slurry, the amount of PTFE used, the type of mixer used to effect dispersion, the intensity of the mixing action, the temperature at which mixing is carried out, and the length of time over which it is effected. It is generally uneconomical to effect a sufficient degree of mixing in the liquid highly fluent state to essentially completely negate segregation of the constituents of the mixture when dried. From a practical point of view, only sufficient energy is expended in mixing the slurry as is required to effect a homogeneous dispersion of the PTFE in the mixture, after which the liquid processing aid is separated from the solid materials in the mixture preferably without the addition of filter aids or precipitation agents which may adversely affect the essential properties of the treated powder.

In the second step of the wet process, separation of solids is effected by any conventional means, such as filtration, centrifuging, and the like. The solid material obtained is an essentially homogeneous workable mass, which though contaminated with liquid processing aid, is subsequently worked for a sufficient period of time to effect fibrillation of the PTFE and the worked mass is then dried by conventional means, for example, in a convection oven.

It will be recognized that a careful choice of the amount of liquid processing aid used, in many instances, will permit the formation of a homogeneous workable mass, at the same time obviating the necessity of separating excess quantity of liquid that is present. If a substantial portion of the excess is to be removed, such removal may be effected prior to the working step, as described hereinabove; or during the working of the workable mass; or after the working is completed. In general, it is preferable to remove essentially all liquid after obtaining the homogeneous mixture, as by filtration, and subsequently to dry the filter cake or by spray drying. The dried filter cake is then subjected to further working as described in the "dry" process hereinbefore, until an indication of the desired degree of desegregation is attained.

Water is a convenient liquid processing aid for solids which are not water-soluble or water-sensitive in the sense that they are adversely affected by contact with water. Where a superfine powder, desirably processed with a liquid processing aid is known to be water-sensitive or hydrophobic, any suitable liquid may be used which is essentially inert to both the water-sensitive powder and to PTFE. Preferred processing aids other than water are those which may be easily separated essentially completely from the solid treated material, and include the primary alcohols, particularly the lower alcohols having from 1 to about 8 carbon atoms, ketones and glycols, particularly those having less than about 15 carbon atoms, silicones, liquid polyhalocarbons and liquid hydrocarbons.

As previously mentioned, the formation of a pliable, doughy mass is normally to be avoided except where it is intended to incorporate additional powdery material into the mass. If, however, a doughy mass is formed, either intentionally or due to inadvertent overworking, continued working, preferably at an accelerated rate, will cause the doughy mass to revert to a dustless powder, the flowability of which is equal to or better than that of the starting material.

The following example serves to illustrate the instant invention.

EXAMPLE 1

A mixture of equal parts of Phthalo Blue 4863*, Color Index 74160 and Hansa Yellow 1236*, Color Index 11741 is prepared in a Waring blender to give a green mixture. The mixture is divided into two equal portions. A colloidal aqueous dispersion of PTFE commercially available as T-30 Teflon ** is added to one portion in an amount of 0.5% weight percent, based on total solids. The mixture is worked in the bowl of a slow speed Hobart mixer heated to about 60° C. The mixer utilizes a slow masticating action, which kneads the pigments and PTFE against the wall and sides of the bowl and forms a network of fibers of PTFE. After a short period of working, there is no visible dusting or segregation, yet the mixture is free flowing and retains its original physical characteristics, except that it is dustless and stable. The other portion is subjected to the same treatment but without the PTFE.

*Code numbers of pigments sold by The Harshaw Chemical Company.
**Trademark of DuPont Company.

The mixture containing the PTFE as well as the mixture without are each then placed in a clear plastic cylinder which is capped. The two cylinders are placed in a vibrator and are vibrated for 30 minutes to simulate shipping. Upon visual inspection following vibration, the shade and texture of the pigment at the top of the untreated mixture is different than that at the bottom whereas the color of the treated pigment containing the fibers of PTFE is uniform from top to bottom.

We claim:

1. A process for substantially negating the segregation of particles of a finely divided powder in bulk, including mixing the powder with a sufficient amount of a fibrillatable polytetrafluoroethylene resin to form a random network of fibers, and working the mixture at a temperature above 20° C. but below the decomposition temperature of the resin or of the finely divided powder, whichever is lower, until a random network of fibers of said polytetrafluoroethylene resin is formed which loosely confines the particles of the powder.

2. The process of claim 1 wherein said fibrillatable polytetrafluoroethylene resin is added in the form of a fine powder or as a colloidal liquid dispersion and in an amount in the range less than about 0.02 to about 20 percent by weight.

3. The process of claim 2 wherein said fibrillatable polytetrafluoroethylene resin is added in an amount in the range from less than about 0.02 to less than about 1 percent by weight, based on total solids.

4. The process according to claim 1 wherein the finely divided powder comprises a blend of at least two materials having different compositions.

5. The process according to claim 1 wherein the finely divided powder consists of particles of disparate size ranges generally less than about 100 mesh.

6. The process of claim 1 including adding a liquid processing aid to the mixture prior to working, said processing aid being essentially inert to both said powder and said polytetrafluoroethylene resin, and removing said processing aid following working.

7. The process according to claim 1 wherein the finely divided powder is composed of particles having size or density differences.

8. The process according to claim 1 including the further step, following working, of blending additional powdery material, either of the same composition or of a different composition, into the worked material.

* * * * *